Oct. 31, 1933.  C. A. SANBORN  1,933,122
WINDSHIELD WIPER
Filed Sept. 3, 1930   2 Sheets-Sheet 1
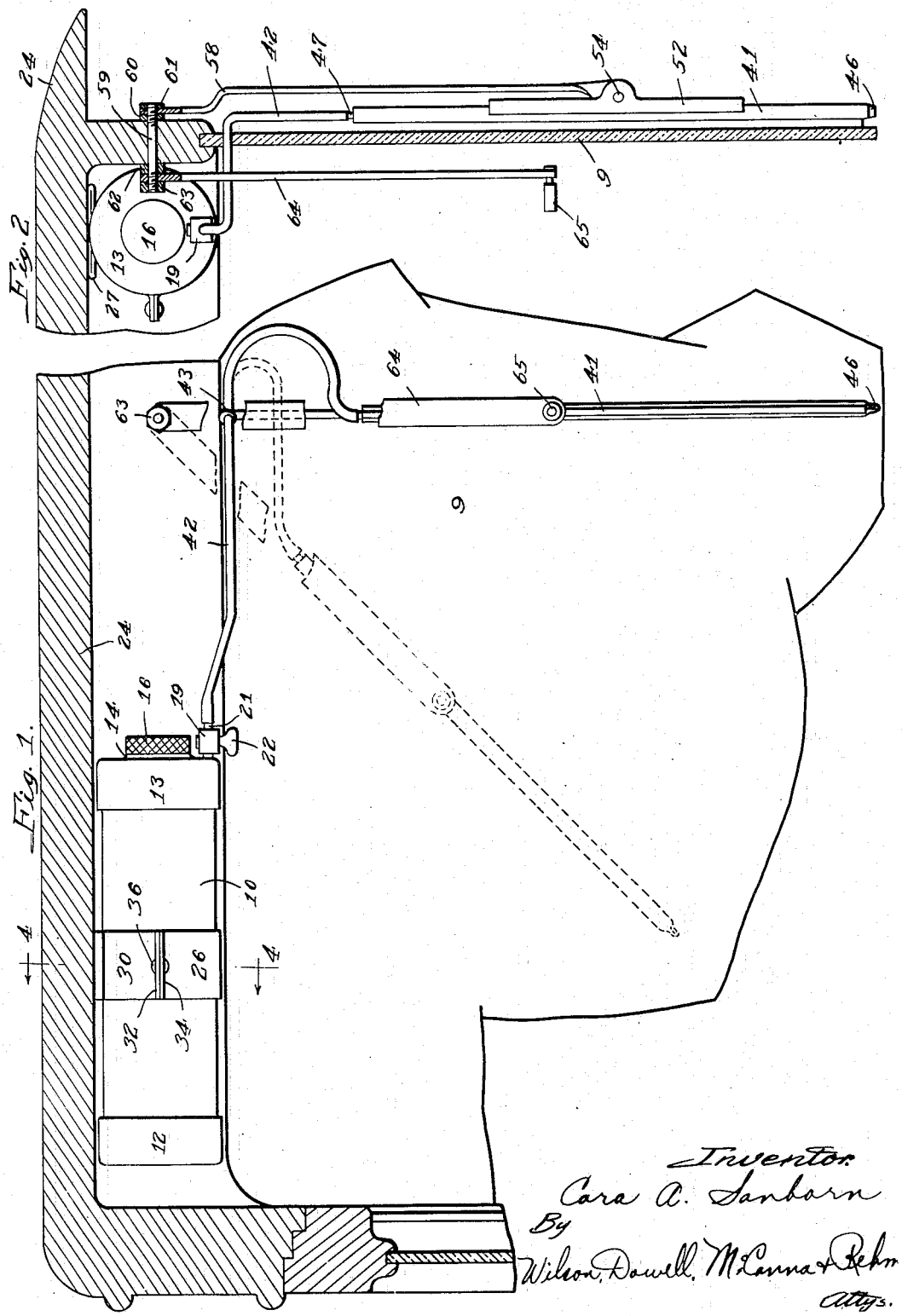

Oct. 31, 1933.    C. A. SANBORN    1,933,122
WINDSHIELD WIPER
Filed Sept. 3, 1930    2 Sheets-Sheet 2
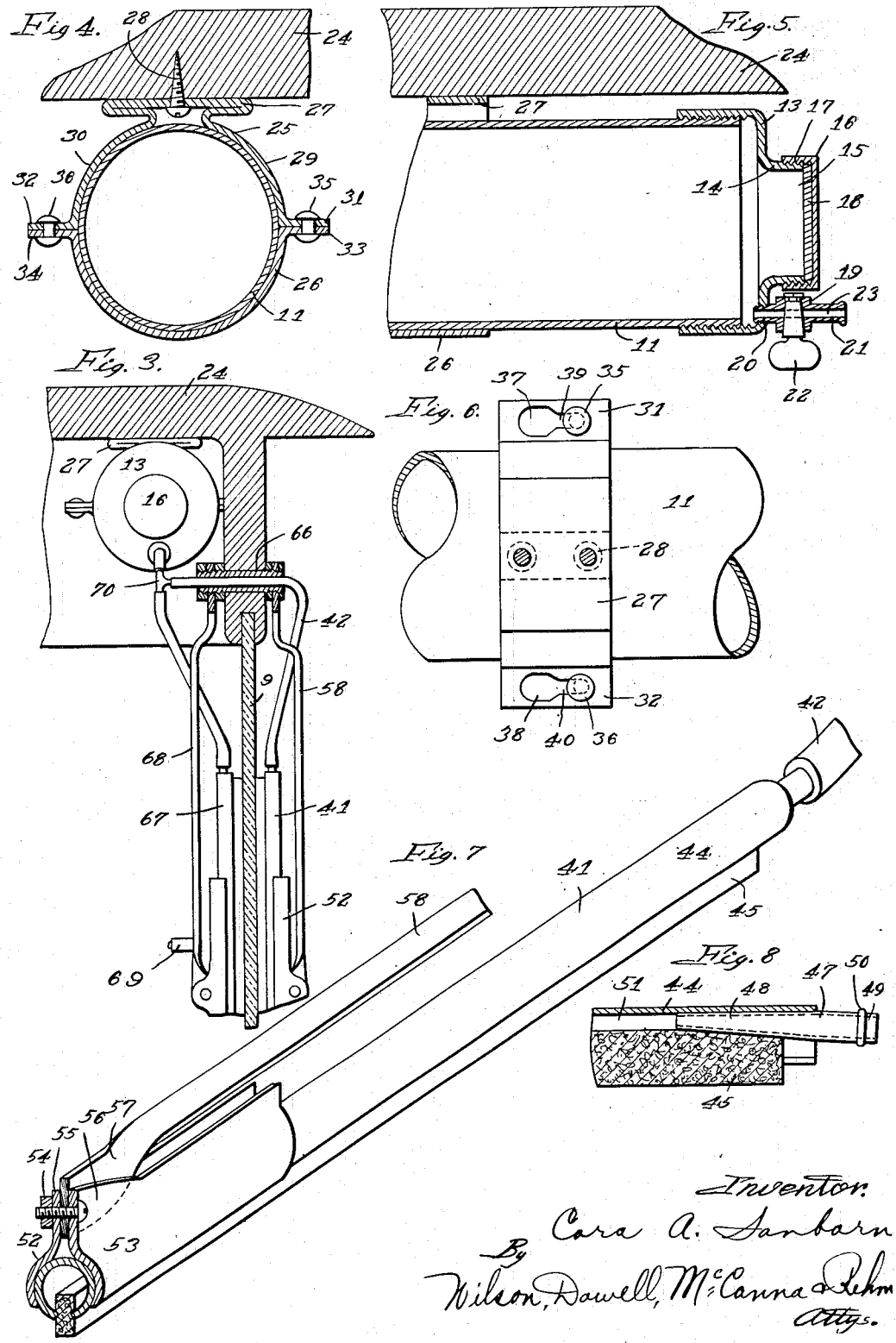

Patented Oct. 31, 1933

1,933,122

UNITED STATES PATENT OFFICE 1,933,122

WINDSHIELD WIPER

Cora A. Sanborn, De Kalb, Ill.

Application September 3, 1930. Serial No. 479,441

2 Claims. (Cl. 15—250)

My invention relates to windshield wipers and has special reference to a wiper adapted to be employed for the purpose of removing or preventing the formation of ice and sleet on the surface of a vehicle windshield, window, or the like.

It has become customary to drive motor vehicles in the northern climates during the entire season and during the colder seasons of the year it is many times necessary to drive during stormy weather when rain or snow tends to freeze on the windshield of the vehicle. Many times one is compelled to drive in violent sleet storms when the windows and windshield become coated with ice to such an extent that it becomes totally impossible to see to drive. However, at this time it is particularly important that the driver's vision be unimpaired because of the precarious footing resulting from ice covered streets and roadways. There is also a tendency on a very cold day, when vehicles are heated internally, for a layer of frost to form on the inside of the glass windows and windshield, thus impairing the vision of the operator.

I have, therefore, aimed to provide an improved windshield wiper adapted to periodically distribute a quantity of anti-freeze liquid over a portion of the windshield to prevent the formation of ice or frost thereon.

Another object of the invention is the provision of an improved and easily replaceable applicator for applying anti-freeze liquid to the surface of the glass.

Another object of the invention is the provision of improved means for holding a quantity of anti-freeze liquid and for regulating the flow thereof to the applicator.

A further object of the invention is the provision of improved means for adjustably holding the applicator in the driving arm.

Another object of the invention is the provision of combined means for simultaneously defrosting the interior and exterior of the windshield in a desired area.

Other objects and advantages will become apparent to those skilled in the art from the following description and the accompanying drawings in which—

Figure 1 is a view of my improved windshield wiper from the interior of the vehicle;

Fig. 2 is a side view of the windshield wiper showing the top and windshield of the motor vehicle in section;

Fig. 3 is a view similar to Fig. 2 showing a modified form in which the tube is carried through the wiper support and a second cartridge is supported on the interior of the windshield to defrost the same;

Fig. 4 is a section through the fluid container substantially on the line 4—4 of Fig. 1;

Fig. 5 is a longitudinal section through the fluid container;

Fig. 6 is a fragmentary view of the fluid container showing the manner in which it is secured to the vehicle;

Fig. 7 is a fragmentary perspective of the cartridge and wiper arm; and

Fig. 8 is a longitudinal section through the upper end of the cartridge showing the applicator nipple.

The invention contemplates in a general way the provision of a liquid container adapted to hold a supply of anti-freeze liquid such as alcohol or ethylene glycol, improved means for securing the container to the vehicle in a manner to permit it to be easily and rapidly removed therefrom for refilling and the like, a cartridge having a surface of soft absorbent material such as felt adapted to be oscillated over the outer surface of the windshield in the manner of the customary windshield wiper, and means for conducting the fluid from the container to the cartridge to maintain the surface thereof in a moistened condition.

A liquid container designated generally by the numeral 10 is formed of a cylindrical body portion 11 having a bottom cap 12 and a top cap 13, though it obviously need not take this particular form. The top cap 13 is provided with a neck 14 as shown in Fig. 5, defining an opening 15. A cap 16 has threaded engagement with the neck 14 as shown at 17 whereby the cap may be secured tightly over the neck to close the opening 15. A packing 18 serves to prevent leakage of the liquid from the cap 16. A cock 19 has a threaded end 20 screwed into the top 13 and a smooth end 21, the purpose of which will presently appear. A handle 22 serves to open or close the cock to permit liquid to flow through the passageway 23.

The container is secured to the top 24 of the vehicle near the front end thereof by means of a bracket having an upper section 25 and a lower section 26. The upper bracket section 25 may be advantageously formed from a single strip of metal to provide a flat portion 27 adapted to receive screws 28 for securing the bracket to the vehicle. Arcuate side portions 29 and 30 are formed to fit the curvature of the body portion 11 and have outwardly projecting ends 31 and 42. The lower bracket section 26 is arcuately formed to fit the surface of the cylinder 11 and is provided with ends 33 and 34. Rivets 35 and 36 are fixedly secured in the ends 33 and 34 and are arranged to project upward therefrom, the heads thereof being receivable through openings 37 and 38 in the ends 31 and 32 of the upper bracket section. When the lower bracket section 26 is brought to this position with the rivets 35 and 36 projecting through the openings 37 and 38, it may be moved to the right facing Figs. 1 and 6, whereby the rivets will move into narrow sections 39 and 40 of the openings 37 and 38 with the upper heads of the rivets bearing against the ends 31 and 32, thereby quickly securing the container 10 and the lower bracket section 26 to the upper bracket section 29. By reversing this operation the container 10 may be quickly removed from the vehicle to be conveniently filled with liquid through the opening 15.

Liquid is conducted from the container 10 to a cartridge 41 through a rubber or other flexible tube 42, the tube having one end passing over the smooth end 21 of the cock 19 and passing through an opening 43 in the windshield 9 to the exterior of the vehicle. Alternative means presently to be described may also be provided for conducting the tube to the exterior of the vehicle.

The cartridge 41 consists of a tube 44 of light weight sheet metal having a longitudinal slit therein adapted to receive an applicator 45 comprising a strip of felt or the like. The lower end 46 of the applicator tube 44 is collapsed and clamped around the lower end of the applicator 45 to provide a liquid tight end. The upper end of the applicator tube 44 is allowed to retain its cylindrical shape to receive a nipple 47 having a tapered end 48 adapted to be inserted in the end of the applicator tube 44 to a point well below the upper end of the applicator 45. This provides a very cheap and yet satisfactory construction which may advantageously be formed from a strip of felt by bending the sheet metal into the form of a cylinder, clamping the felt between the edges thereof, and closing the lower end. The upper end 49 of the nipple 47 is provided with an outwardly projecting rim 50 to receive the rubber tube 42 and prevent it from slipping off the end 49 of the nipple 47. It will be seen that through this arrangement the liquid flowing from the container 10 through the tube 42 is deposited within the applicator tube 44 well below the upper end of the applicator 45, flowing into a chamber 51 within the applicator tube 44. The applicator 45 being of soft absorbent material will absorb the liquid in the chamber 51 until it becomes substantially saturated.

Where the customary windshield wiper is found on the vehicle to which my invention is to be applied the cartridge 41 may be secured directly to the wiper arm thereof whereby it will be oscillated across the surface of the windshield in the same manner as the standard wiper. A pair of cartridge clips 52 and 53 are provided, arranged to bear against opposing sides of the applicator tube 44 and be clamped thereupon by means of a screw 54 passing through upstanding ears 55 and 56. The screw 54 which is interposed between the ears 55 and 56, thereby adjustably securing the cartridge to the wiper arm 58.

Where the wiper is to be employed independent of other wiping mechanisms, mechanical means are provided for moving the applicator over the surface of the windshield. This may advantageously consist of a pin 59 passing through the front of the vehicle as shown in Fig. 2 or through the windshield itself as may be desired. A pair of nuts 60 and 61 may be threaded on the outer end of the pin 58 to secure the wiper arm 58 fixedly to the pin 59. A second pair of nuts 62 and 63 may be threaded on the rear side of the pin 58 to fixedly secure a rod 64 thereto, the rod 64 having a handle 65 rotatably positioned at the lower end thereof. Thus by grasping the handle 65 and manually oscillating the rod 64 about the pin 59, the latter will be rotated, causing oscillation of the wiper arm 58 in the manner of the conventional hand operated wiper.

A modification is shown in Fig. 3 wherein a tube 66 is employed for supporting the wiper arm 58 in place of the pin 59, the tube being of sufficient size to receive the rubber tube 42, whereby only a single opening need be made in the forward side of the vehicle to accommodate both the driving mechanism and the liquid conducting tube 42. If desired, a second cartridge 67 may be supported against the interior of the windshield upon an arm 68, which may be supported upon the tube 66 in place of the rod 64 and serve the purpose thereof, a knob 69 being secured thereto to facilitate manual operation thereof. A T or Y may be placed in the rubber tube 42 to conduct liquid to both cartridges as shown at 70. The two cartridges should be placed in opposition so that the movement of the two across the windshield will not tend to increase the confusion of vision. The cartridge 70 may be secured to the shaft of an automatic wiper if desired to prevent the formation of frost on the interior of the glass, the usual squeegee being removed from the outer surface.

The manifold advantages of my improved construction will have become apparent to those skilled in the art. The liquid container 10 is quickly and easily removable from the supporting bracket so that it may be lowered to a position convenient for removal of the cap 16 for refilling the container.

The rate at which the anti-freeze liquid is delivered to the cartridge is at all times under the control of the operator who may start, increase, decrease, or stop the flow thereof by suitably manipulating the handle 22 of the cock 19, thereby delivering a desired quantity of liquid to the cartridge depending upon the weather conditions encountered and the amount required to keep the windshield free of ice.

The cartridge is such that it may be employed to replace the squeegee of the conventional windshield wiper, whether it be automatic or hand operated. The cartridge is readily adjustable with respect to the wiper arm whereby it may be adjusted to clear the windshield in a desired area dependent upon the height of the driver of the vehicle. Because of this feature a tall man may raise the cartridge to clear the windshield at a point well up along its surface while a short man may lower the cartridge to suit his convenience.

The cartridge may be manufactured at very small cost and consequently may be replaced at frequent intervals. Therefore when the surface of the applicator becomes soiled to such an extent that it leaves the windshield smeared as it passes over the surface thereof, the cartridge may be discarded and a new one substituted. It is particularly important that this be possible because of the frequency with which the applicator becomes so soiled as to render the device useless.

The nipple 47 is particularly helpful in making it possible to provide a cartridge which may be manufactured at a small cost since by the use thereof it becomes unnecessary to provide a liquid tight cap or connection for the upper end of the applicator tube 44.

While I have thus described and illustrated a specific embodiment of my invention I am aware that numerous alterations and changes may be made therein without materially departing from the spirit of the invention and I do not wish to be limited except as required by the prior art and the scope of the appended claims in which—

I claim:

1. In a vehicle windshield wiper, a cartridge, comprising a tube adapted to hold an anti-freeze liquid, having a longitudinal slot therein, an applicator of porous material clamped in said slot, a portion thereof extending into said tube and a portion thereof projecting from said tube substantially throughout its length, means at the lower end of said tube to prevent the flow of liquid therefrom, a tapered nipple in the upper end of said tube frictionally held therein, the outer end of said nipple being arranged to receive a tube for the delivery of an anti-freeze liquid.

2. In a vehicle windshield wiper, a reservoir within the vehicle for anti-freeze liquid, applicators for distributing said liquid over both sides of said windshield, a pair of arms for moving the applicators over the windshield, a tubular shaft passing through the front of the vehicle having said arms fixedly secured to opposite ends thereof, said shaft having bearing support in the front of the vehicle, means for rotating said shaft, and means for supplying fluid to said applicators comprising a one-piece flexible conduit leading from the applicator on the exterior of the windshield through said shaft to the interior of said vehicle, a T connection connected to the end of said flexible conduit, a one-piece flexible conduit leading from said T connection to the other of said applicators, and a flexible conduit leading from said T connection to said reservoir, said T connection and the conduits leading therefrom to the applicators being arranged to move as a unit with said shaft and said arms.

CORA A. SANBORN.